May 4, 1965  S. H. NEWMAN  3,181,317
CIGARETTE LIGHTER
Filed Oct. 16, 1961  6 Sheets-Sheet 2
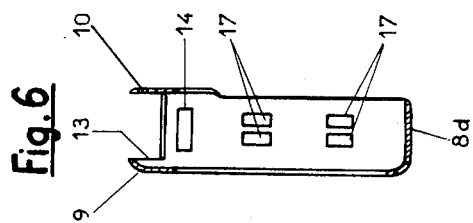
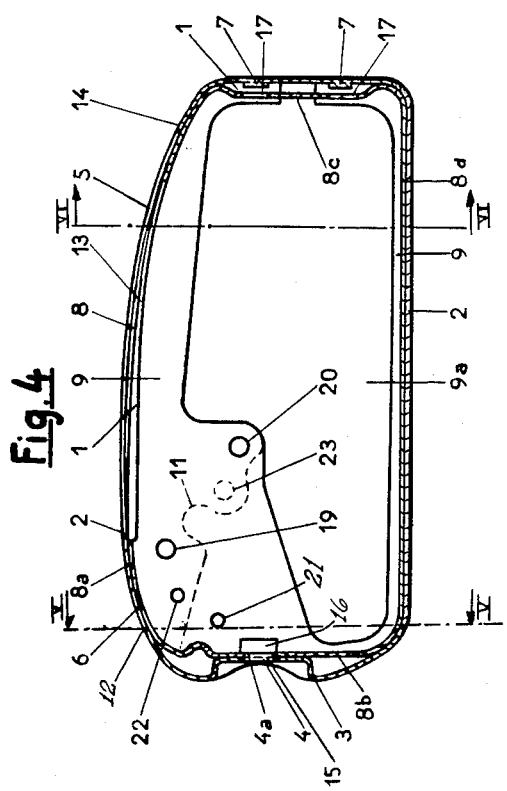
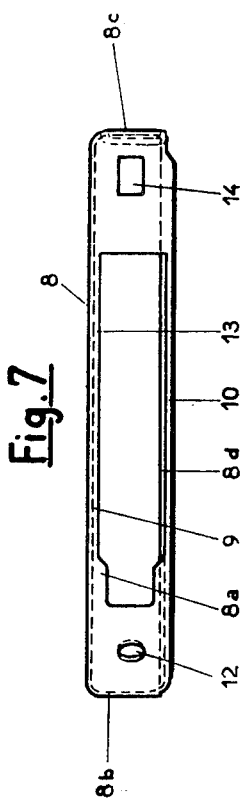
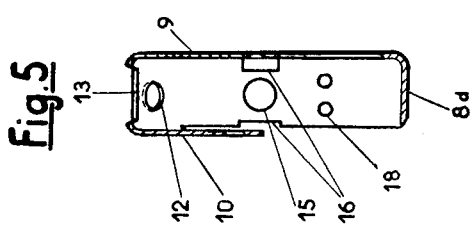
INVENTOR
STANLEY H. NEWMAN
BY
Curtis, Morris & Safford
ATTORNEYS May 4, 1965 S. H. NEWMAN 3,181,317
CIGARETTE LIGHTER
Filed Oct. 16, 1961 6 Sheets-Sheet 3
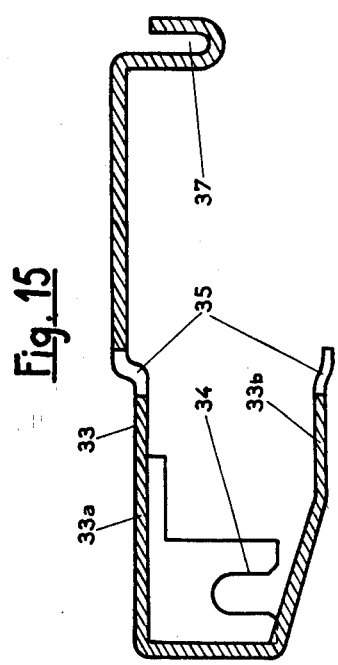
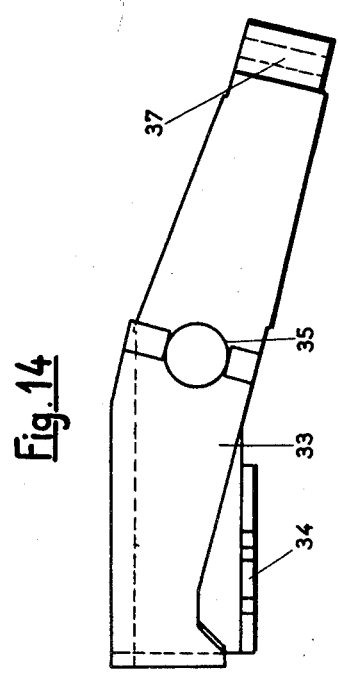
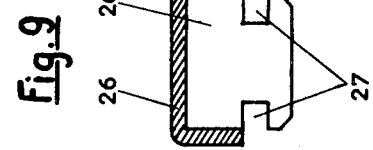
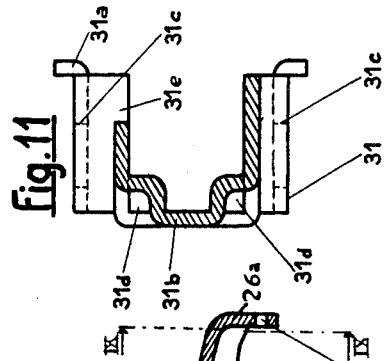
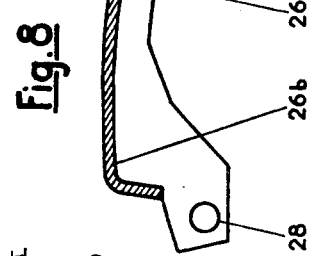
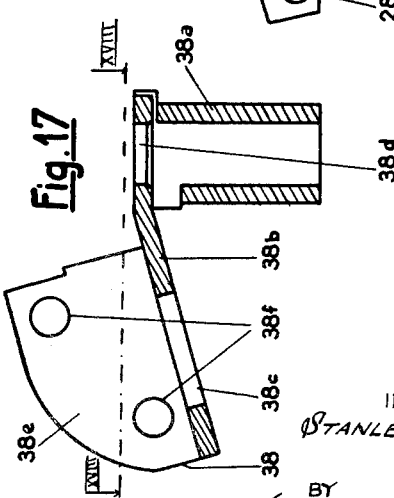
INVENTOR:
STANLEY H. NEWMAN
BY Curtis, Morris & Safford
ATTORNEYS May 4, 1965     S. H. NEWMAN     3,181,317
CIGARETTE LIGHTER
Filed Oct. 16, 1961     6 Sheets-Sheet 4
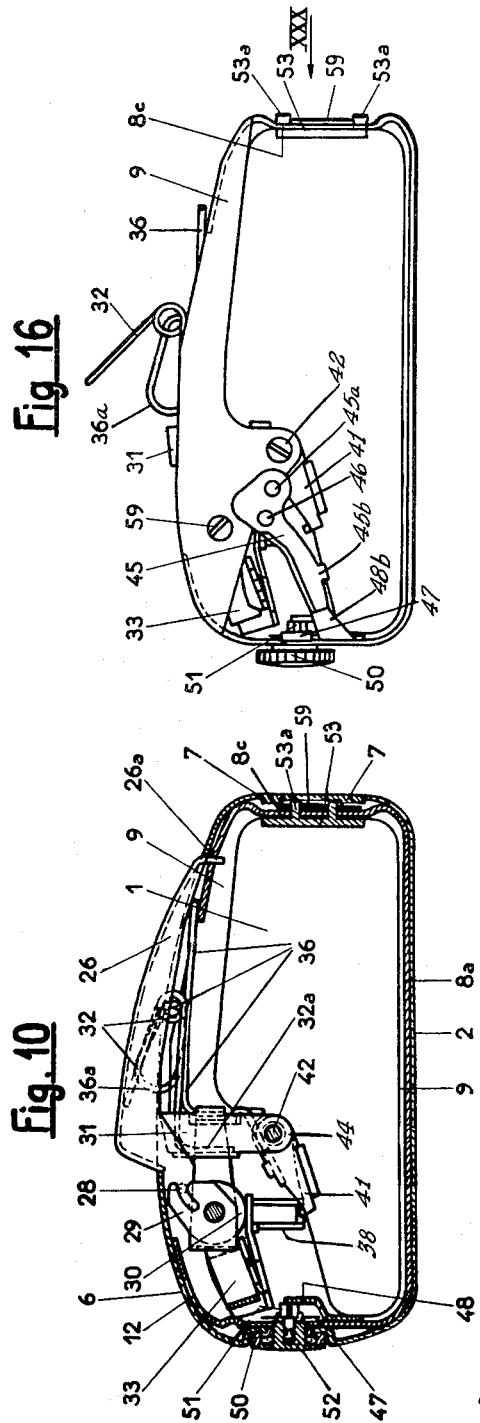
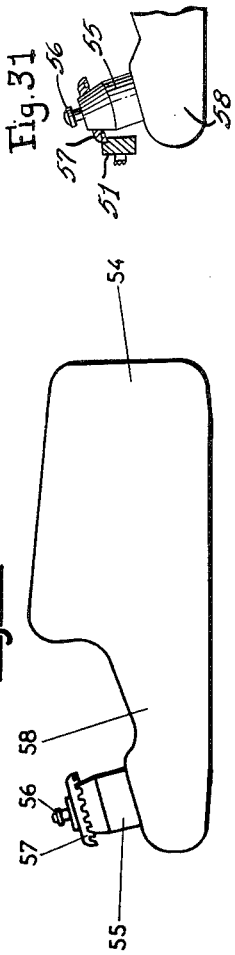
INVENTOR:
STANLEY H. NEWMAN
BY
Curtis, Morris & Safford.
ATTORNEYS:

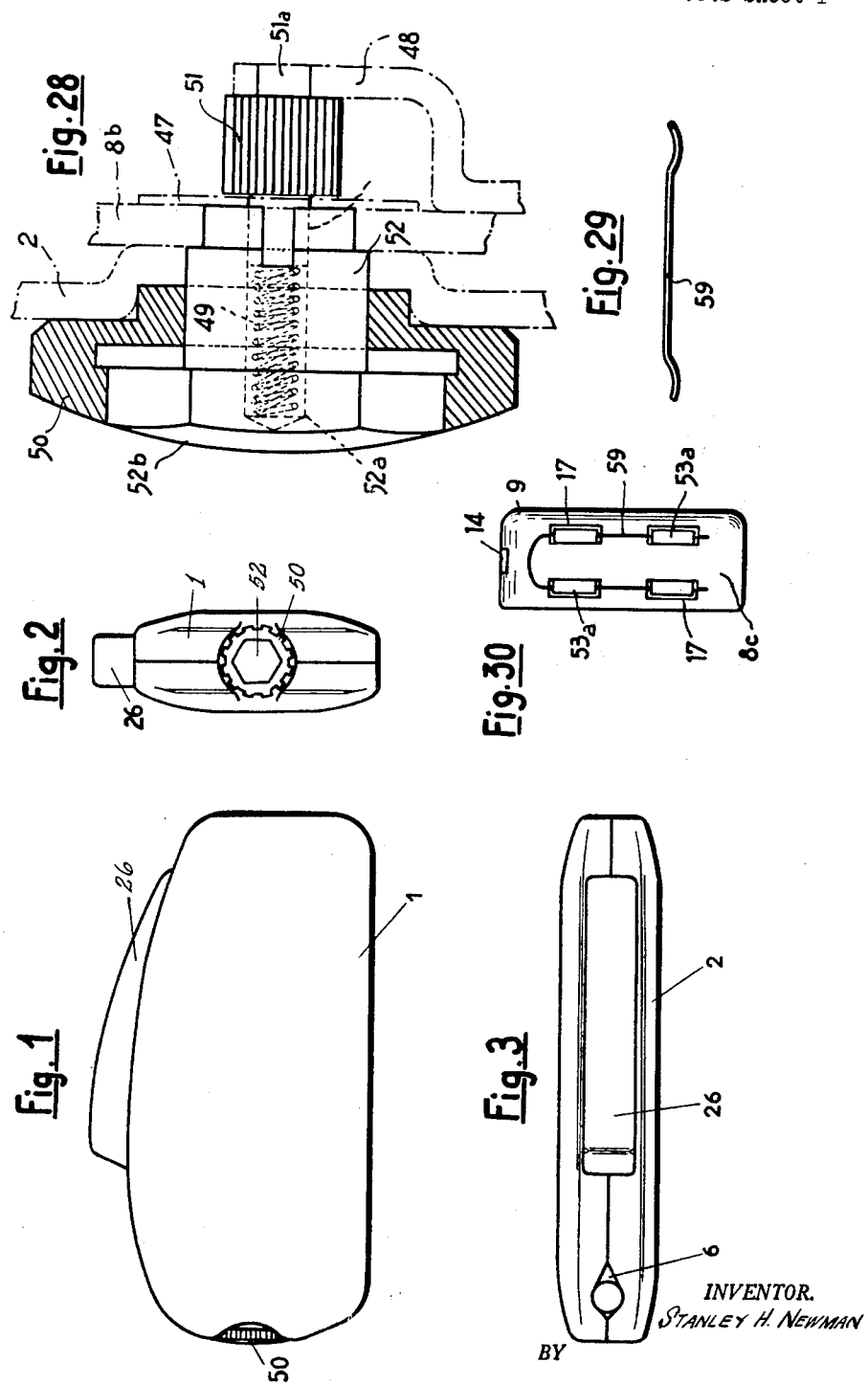

May 4, 1965   S. H. NEWMAN   3,181,317
CIGARETTE LIGHTER
Filed Oct. 16, 1961   6 Sheets-Sheet 5
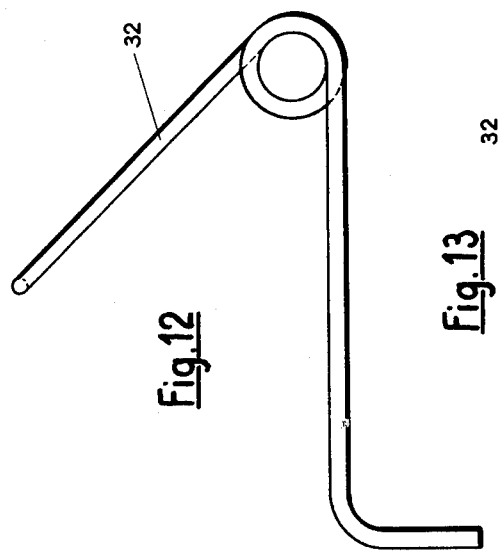
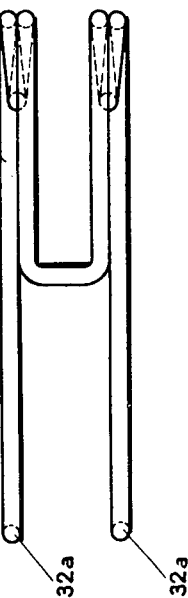
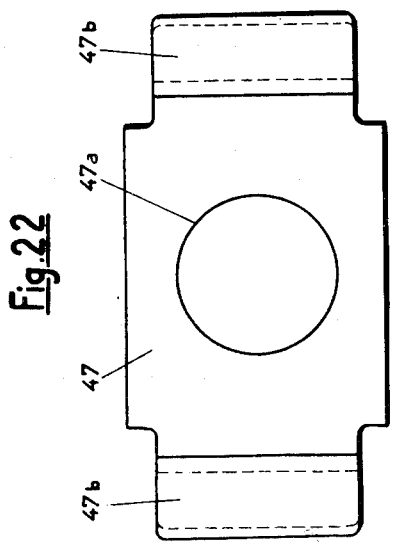
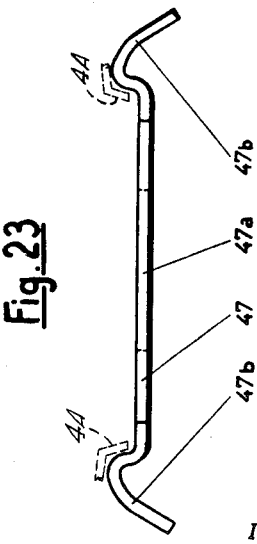
INVENTOR.
STANLEY H. NEWMAN
BY
Curtis, Morris & Safford
ATTORNEYS:

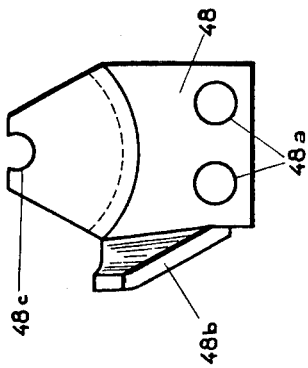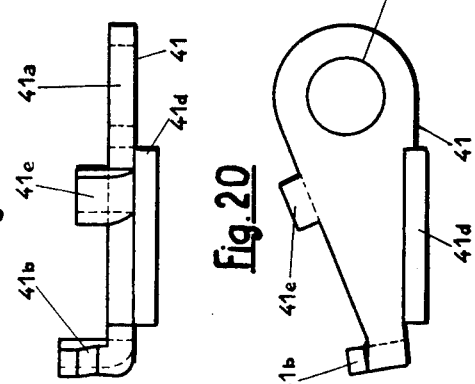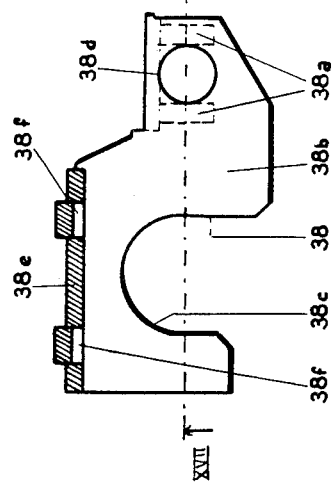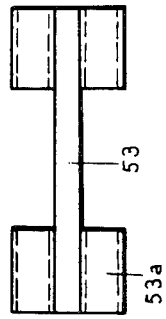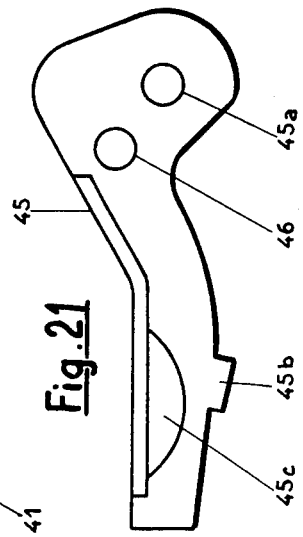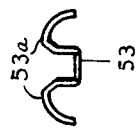

United States Patent Office 3,181,317
Patented May 4, 1965

3,181,317
CIGARETTE LIGHTER
Stanley H. Newman, Savoy-Hilton Hotel, New York, N.Y.
Filed Oct. 16, 1961, Ser. No. 145,265
9 Claims. (Cl. 67—7.1)

The present invention relates to cigarette lighters.

More particularly it relates to gas type lighters which can be easily disassembled, are of flattened ovoid-like shape, and composed of three main parts, namely, a case, a flame actuating-mechanism and holder, and a tank which bears the gas valve. The actuating-control holder includes a frame on or in which there is mounted the flame actuating mechanism. The actuating mechanism includes the actuating push-lever with its spring, the driver and the knurled spark wheel, the lever for the opening of the gas expansion valve, a flint holder and a flint-push lever and its spring. The lighter of the present invention is characterized by the fact that the case is formed of two shells which are assembled together and about the frame. The shells are attached to the front of the frame by a locking system consisting of a spring and a push-lever and then on the rear of the frame, by a spring catch and socket. The frame comprises a continuous bond and two fixed side plates parallel to the side faces of the lighter and bearing furthermore a member for actuating the flint-push lever and for locking the tank in the frame. Further, an assembly is provided comprising the front part of the case locking mechanism and the control of a mechanism for adjusting the height of the flame by a connection with the gas valve. A guide member for the actuating lever is also provided.

In the accompanying drawings, one embodiment of the invention has been shown by way of example.

FIGURE 1 is a side elevation of the lighter.
FIGURE 2 is a corresponding side view.
FIGURE 3 is a top view.
FIGURE 4 is a cross section through the frame and one half the case.
FIGURE 5 is a cross section through the frame along the line V—V of FIGURE 4.
FIGURE 6 is a cross section through the frame along the line VI—VI of FIGURE 4.
FIGURE 7 is a top view of the frame.
FIGURE 8 is an axial longitudinal section through the actuating push-lever.
FIGURE 9 is a section along the line IX—IX of FIGURE 8.
FIGURE 10 is a longitudinal section similar to FIGURE 4 showing certain parts borne on the frame.
FIGURE 11 is a horizontal cross section through the guide of the actuating push lever.
FIGURE 12 is an elevation view of the spring of the push lever.
FIGURE 13 is a plan view of the spring of the push lever.
FIGURE 14 is an elevational view through the lever for the opening of the valve.
FIGURE 15 is a horizontal sectional view through the lever for the opening of the valve.
FIGURE 16 is a cross section similar to FIGURE 10 of the belt alone bearing certain parts.
FIGURE 17 is a vertical section through the flint along the line XVII—XVII of FIGURE 18.
FIGURE 18 is a horizontal cross section along the line XVIII—XVIII of FIGURE 17.
FIGURE 19 is a top view of the flint-push lever.
FIGURE 20 is an elevational view of the flint-push lever.
FIGURE 21 is an elevation of the pawl of the flint-push lever.

FIGURE 22 is an elevational view of the front closure spring.
FIGURE 23 is a plan view of the front closure spring.
FIGURE 24 is a face view of the support of the locking mechanism.
FIGURE 25 is an elevation of the rear lock.
FIGURE 26 is a section along the line XXVI—XXVI of FIGURE 25.
FIGURE 27 is an elevation of the tank.
FIGURE 28 is an elevation on a large scale, with partial section, of the front part of the mechanism for the locking of the case and of the part of the mechanism for the adjustment of the height of the flame borne by the body of the lighter.
FIGURE 29 is a section through the rear closure spring through an axial plane perpendicular to the plane formed by the main part of the two arms of the U member along which the spring is bent.
FIGURE 30 is an elevation through the rear of the belt with the rear lock in place, seen in the direction of the arrow XXX of FIGURE 16.
FIGURE 31 is a partially fragmentally partially sectional view showing the relationship between the valve and its adjusting means.

From the drawings, it can be seen that the lighter in accordance with the present invention consists of three main parts namely, a case, a mechanism-holder frame and a tank each of special shape and adpted to cooperate with each other. The case is itself composed of two parts; the frame bears the actuating push member, the lighting-device spark wheel assembly and a part of the mechanism for adjusting the height of the flame; and the tank bears the gas expansion valve and the other part of the mechanism for adjusting the height of the flame.

As shown in FIGURES 1 to 3 in particular the lighter "L" is generally of a flattened and a slightly oval-like outer contour, with a curved top, a substantially flat lower face, a slightly curved front end and a substantially flat rear end.

Each half of the lighter case or shell (FIGURES 1 to 4 in particular) is composed of a stamped or cast plate metal having a side and a peripheral rim 2, the rim being about half the thickness of the lighter. At the front end of the lighter, a circular recess 3, pierced at its center by an opening 4 and provided with a projection 4a, is intended to receive the outer mechanism for adjusting the height of the flame and the mechanism for locking the case. On the upper part of the case, a wide notch 5 is provided in the rim 2 and it serves to house the push-lever which will be described further below, while a second smaller notch 6 located towards the front of the case permits the passage of the flame. Two small plates 7 soldered at the rim 2 at the rear of the shell or integral with said rim are provided to constitute one of the members for the assembling of the case and the frame, as will be seen further below.

The frame, designated as a whole by 8, is housed within the shells 1. As shown in FIGURES 4 to 7 in particular, it comprises a sort of continuous member which in effect forms the frame and comprises essentially a top 8a, a front side 8b, a rear side 8c, and a bottom 8d. A right side plate 9 which is cut away at 9a and a left side plate 10 which occupies only the upper part of the second side face of the belt and the shape of which is indicated in dot-dash lines at 11 of FIGURE 4 form a single unit with the frame 8a, 8b, 8c, 8d. The width of the frame is calculated in such a manner to adjust itself precisely to the inside of the two halves 1 of the case. The top 8a is cut out at 12 to permit the flame to pass and at 13 and 14 to receive the actuating push lever. The side 8b is provided with a circular hole 15 for the passage of the locking and flame-regulating mechanisms; it furthermore has notches 16 for the locking mechanism and holes 18 to receive the attachment lugs of a support 48 (see FIGURE 10 in particular) which will be referred to further below. Side 8c is provided with four button holes 17; this assembly, as will be seen further below, is part of the locking system for the case. The side plate 9 is provided with holes 19 to 22, the purpose of which will be explained below and the side plate 10 is provided with holes aligned with holes 19 and 20 and with a hole 23 shown in dotted line in FIGURE 4.

The frame bears the actuating mechanism of the lighter. The latter comprises an actuating push lever 26 (as shown in FIGURES 1 to 3, 8 to 10 in particular) of a U-shaped cross section (FIGURES 8 and 9) which, at its downward curved rear end 26a (to the right in FIGURE 8) has two horizontal notches 27. At its front end, it has two lugs 28 for connection with the driver 29 of conventional type which actuates the knurled spark wheel 30 (FIGURE 10). The driver and knurled wheel are mounted on a shaft supported in the holes 19 of the belt.

It is advantageous to select for the lugs 28 a metal which has a high resistance to abrasion as compared with the metal which forms the rest of the lever. For instance, this metal may be hardened steel, the lever (and the other main parts of the lighter) being of brass.

The operating lever is in practice intended to receive an external decoration and is therefore of high cost. Its replacement in case of premature wear would therefore be costly. Now, the only parts which are subject to easy wear are the surfaces of frictional contact with the actuating surfaces of the driver.

The rear part of the lever at which it is pivoted in the belt in a manner which will be described below is subjected to smaller stresses and therefore wears much less particularly as the frame and the lever generally are made of the same relatively malleable metal while the driver must necessarily be of a harder and more resistant metal.

The rear end of 26a of lever 26 penetrates into the slit 14 of the belt which is rectangular as shown in FIGURE 7 and the length of which is slightly greater than the total width of the end 26a, while its width is slightly greater than the width of the lever can be introduced at a right angle with the length of the lighter and then turned 90° so as to cause the longitudinal edges 27 of the lever and slit 14 to engage with the notches 27 of the lever. A guide 31 of U-shape cross section in a horizontal plane (FIGURES 11 and 16) is soldered by means of tabs 31a against the side plates 9 and 10 of the belt. Its vertical face 31b serves as guide for the front end 26b of the lever 26. Holes 31c permit the passage of a pivot pin 42 (FIGURE 10) mounted in the holes 20 of the belt.

A spring 32 having the shape shown in FIGURES 10, 12, 13 and 16 urges the lever 26 upwards. Its ends 32a are hooked in recesses 31d provided in the guide 31 (FIGURE 11).

A valve lever 33 having the shape shown in FIGURES 14 and 15 has a notch 34 intended to cooperate with the rod of the burner forming a flap of the expansion valve discussed below. The arms 33a and 33b of this lever are pierced with holes 35 for the passage of a horizontal pivot pin which is the same as that of the driver 29 and of the knurled spark wheel 30 and is mounted in the holes 19 of the belt. A spring 36 (FIGURES 10 and 16) of suitably bent steel wire, one end of which engages in a hook 37 (FIGURES 14 and 15) formed at the rear end of the lever 33 and located between the two arms of the spring 32 urges the lever 33 to raise the front notched end thereof when the user, by depressing the lever 26, brings the top of the lever, after a lost motion corresponding to the actuation of the knurled wheel 30, into contact with the part 36a of spring 36.

A flint-holder 38 (FIGURES 10, 17 and 18) comprises a vertical portion 38a containing the flint and this portion being of U-shaped cross section in horizontal plane, a plate 38b which is slightly inclined towards the front of the lighter and which has a notch 38c for the passage of the gas expansion mechanism and a hole 38d to permit the flint to come into contact with the knurled wheel and a vertical plate 38e bearing two studs 38f which penetrate into the holes 21 and 22 of the frame 8, the fastening being effected, for instance, by a spot welding.

With the flint holder 38 there is associated a flint push lever 41 (FIGURES 10, 16, 19 and 20) provided with a hole 41a for the passage of the pivot 42 which, as previously described is mounted in the holes 20 of the frame and passes at the same time to guide 31. The lever 41 bears a nose 41b which engages in the part 38a of the flint holder and applies the flint which is contained therein in contact with the knurled wheel 30 due to the action of a spring 44 (FIGURE 10) wound around the said pivot pin and which rests against the portion 31e of the guide 31 and against a lug 41e of the lever 41.

A pawl 45 (FIGURES 16 and 21) is pivoted at 45a to a rivet which is mounted in the hole 23 of the side plate 10 of the frame and bears at 46 a stud which cooperates with a protrusion 41d of the lever 41 to drive said lever downward against the action of the spring 44 so as to free the flint for its replacement. Furthermore, the pawl 45 has a protrusion 45b and a reinforcement 45c the role of which will be explained further below. The arrangement of the lever, of the pawl and of the spring is such that the pawl can remain in its end-of-stroke position towards the bottom with the lever out of the flint holder in order for the introduction of a flint, and be displaced upwards without driving the lever along with it, so as to permit the unlocking of the tank, as will be explained herein below.

The frame 8 furthermore bears the locking mechanism for the case. This mechanism comprises a front closure spring and a rear closure. The front spring (FIGURES 10, 16, 22 and 23) consist of a blade 47 pierced at its center by a circular hole 47a the ends of which bent at 47b are housed in notches 16 of the side 8b of the frame and can come into engagement with the proturusions 4a of the opening of the case (FIGURE 4).

A support 48 (FIGURES 10, 16 and 24) fastened to the side 8b by lugs 48a which are housed in the holes 18 of the belt as indicated previously, has a tongue 48b with which the end of the pawl 45 can come into engagement so as to lock the tank in place, as will be seen further below. In the hole 15 of the frame, there passes the pin 52 forming a push member (FIGURES 2, 10 and 28), in the inside 52a of which there is housed an end of the pin 51a of the pinion 51, the other end of which turns in a recess 48c of the support 48.

A spring 49 is placed in the bottom of the bore hole 52a and urges the head 52b of the push member 52 towards the outside of the lighter. A knurled button 50 which is cut out at its center in accordance with a polygonal contour, preferably a hexagonal contour, contains the head 52b, of corresponding shape of the push member 52, the other end of which rests against the face of the spring 47. When one pushes on the face 52b of the push member 52, the blade 47 is therefore displaced towards the inside of the lighter.

The presence of the pinion 51 is not disturbing since its diameter is smaller than that of the hole 47a. This movement of the blade assures the locking of the case which will be seen further below.

The button 50 fits precisely in the reinforcement 3 formed by the shells 1 so as to be flush with the outer surface of the case (FIGURE 1) and engages with a soft frictional fit around the push member 52 in the hole 4 of the case.

The rear closure (FIGURES 10, 16, 25 and 26) consists of a blade 53 cut out so as to have four tongues 53a bent in such a manner as to form approximately cylindrical protrusions which penetrate into the button holes 17 of the side 8c of the belt and form housings on the outside of the latter (FIGURE 26). A spring 59 (FIGURES 29 and 30) of wire bent on itself to form a U and curved as shown in FIGURE 29, inserted within the frame and passing into the tongues 53a of the closure, maintains the latter in position and under pressure.

When the frame is in place in one half 1 of the case, the plates or protrusions 7 of the shell fit elastically around the protrusions 53a and possibly in the button holes 17 and lock the belt in the rear of the case. The same is true at the front due to the coming into engagement of the ends 47b with the protrusion 4a on the edge of the opening 4 on each shell. By pressing on the push member 52, the members 4a and 47b are released and one half of the case can be raised and the protrusions 7 freed from the protrusions 53a. One thus has access to the inside of the lighter and to the tank 54.

The latter has the shape shown in FIGURE 27. At the front, on its upper face, it bears the gas expansion mechanism housed in a cylindrical shell 55 which is tightly fastened to the tank. The expansion mechanism itself does not form part of the present invention and may be of any known type; preferably, it is of the type described in the U.S. patent application filed in the name of Stanley Herbert Newman, Serial No. 21,220, on April 11, 1960, now U.S. Patent No. 3,096,636, issued July 9, 1963. It comprises essentially a burner 56 which forms a flap rod and opens the passage to the gas when it is raised. For this purpose, the head of the burner 56 has a swelling under which the tongue 34 of the valve lever 33 can engage so as to raise the flap. Furthermore, the mechanism for adjusting the height of the flame, preferably of the type mentioned in the aforementioned U.S. Patent No. 3,096,636, issued July 9, 1963, is actuated from the outside of the shell 55 by a toothed wheel 57 which, when the tank is in position in the case, meshes with the pinion 51 (FIGURES 10 and 16) in such a manner that it can be turned when the knurled button 50 is turned. The cut out 58 between the mechanism 55 and the upper part of the tank is intended to receive the flint holder 38 and the part of the side plates 9 and 10 of the frame in which the lever 41 is pivoted.

It will be noted that the mounting on the belt of a part of the case locking mechanism which is closely associated with the actuation, from the outside of the lighter of the mechanism for the adjustment of the height of the flame and combined with a tank-locking system, is of considerable practical advantage; namely, the advantage of assuring an automatic engagement of the pinion 57 forming part of the adjustment mechanism borne by the tank, and the mating pinion 51, which is rigidly connected with the case. If the tank were not immobilized in a strictly constant position, the teeth of the pinions would run the risk of "shattering," breaking or blocking. Furthermore, the combination of the adjustment knob 50 and of the opening push member 52 makes it possible to mount the pinion 51 in a very simple manner by arranging its pin in the rod of the push member, which avoids the necessity of a special bearing for this pin, in the belt of the lighter. Finally, by using two pinions to actuate the disc for adjusting the flame instead of a direct transmission by a pin with knurled head which passes through a special opening in the body of the lighter and is rigidly connected with the expansion mechanism borne by the tank, one can achieve a stepped-down transmission which permits not only a more precise adjustment of the height of the flame but also makes it possible to avoid the accidents which might result from an unintentional change in adjustment, for instance, as a result of rubbings in the pocket of the user.

In order to assemble the lighter, one proceeds as follows: there are assembled on the frame 8, one after the other, the various members which it is to bear and which have been described above, that is to say, the spring 47, the support 48 and the mechanisms 49 to 52, the flint holder 38 with the lever 41 and its pawl 45, the guide 31, the assembly consisting of the knurled wheel 30 and the driver 29, the springs 32, 36 and 44 and the rear closure 53, 59. The lever 26 is then put in position by first of all introducing the tail 26a into the opening 14 and then placing the lugs 28 in the corresponding notches of the driver. The frame is then placed in the right hand half of the case 1, and the pawl 45 is swung in order to release the flint holder and to place a flint between the walls 38a. The pawl is swung back completely upward to put the tank 54 in position, the tank being locked by means of the pawl 45 which engages under the tongue 48b of the support 48. This movement brings the reinforcement 45c of the pawl 45 in contact with a part of the exterior cylindrical surface of the casing 55 of the expansion mechanism, while the flange 45b comes to bear against the upper part of the surface of the portion of the tank 54 which surrounds the connection of the casing 55 to said surface. The burner 56 is automatically in engagement with the lever 33 and the wheel 57 with the pinion 51. As stated, the frame is locked to the case by the spring 47 and the closure 53, and it is sufficient to press on the second shell in order to close the lighter.

The operation of the illustrated lighter is as follows: when one presses on the lever 26, the latter pivots at 14, 27 and slides along the guide 31, causing the driver and therefore the knurled wheel to turn. Sparks are produced. The balance of the movement of the lever 26 compresses the spring 36 and raises the valve lever 33. The head 56 of the burner, by rising, permits the gas to pass, the gas igniting in contact with the sparks. The flame emerges from the lighter through the openings 12 of the belt and 6 of the case. In order to adjust its height, the button 50 is turned a greater or lesser amount in one direction or the other.

In order to open the lighter, one pushes the push member 52 and the opening spring pushes away the half of the case 1 which now need only be withdrawn, which affords access to the tank in order to replace the latter when it is empty, and to the flint in order to replace it when it is used up. In order to effect this latter operation, it is merely necessary to lower the pawl to its lowermost position.

It should be understood that the embodiment described and shown has been given merely by way of example and can undergo various modifications in detail without going beyond the scope of the invention which is set forth in the accompanying claims.

I claim:

1. A lighter of ovoid-like longitudinal and substantially flattened transverse shape, adapted to be easily disassembled and comprised of three main cooperating parts, namely, a case, an actuating mechanism holder and a gaseous fuel supply tank which includes a gas expansion valve mechanism; the actuation mechanism holder consisting of a frame to which is attached an actuating push lever, a spring, a driver, a knurled spark wheel, a lever for opening of the expansion valve, a flint holder, a pivoted flint-push lever and a spring, said push lever acting against the spring to move the driver whereby the spark wheel is rotated and the expansion valve lever opens said valve at the same time as the spark wheel is rotated and a stream of sparks is created by the rotating spark wheel contacting a flint held in the flint holder by the flint-push lever and spring, said lighter having a case formed of two shells a spring and push member locking system and a rear closure spring, said shells placed about the frame and abutting each other, said shells held assembled to each other and with the frame at the front of the frame by the spring and push member locking system and at the rear by a closure spring, assembly, said frame comprising a continuous member and two fixed side plate flanges parallel to the side faces of the lighter, said frame bearing thereon a pivoted combination pawl for actuating the flint-push lever 41 and also locking the tank within the frame.

2. A lighter as defined in claim 1 and further including an assembly connected to the front frame locking system, said assembly interconnected to the gas expansion valve for varying the flow of gas therefrom whereby the height of a flame of burning gas may be varied.

3. A lighter as defined in claim 1 wherein the rear closure spring assembly includes a spring mounted on the rear of said frame and said shells have a plurality of mating projections extending inwardly from the rear portions of the shells, said spring having a plurality of tongues projecting outwardly therefrom which are adapted to be engaged with the plurality of mating projections extending inwardly from the rear portion of the shells.

4. A lighter as defined in claim 1 wherein the front portion of each shell has a recess therein with an edge portion cut out and bent inwardly to form a projection, said front spring and push member locking system including a blade spring member mounted on a spring loaded push rod cut out portion in each of said shells forming an opening for the passage of the push rod therethrough, said rod extending through an opening in the frame and said spring positioned within the frame, and in contact with the projections whereby the end portions of said spring are normally in locking engagement with the shell projections and said shells are held in position about said frame.

5. A lighter as defined in claim 4 wherein a support is positioned on the inner portion of the frame and near the push rod, a recess in the upper portion of support in axial alignment with the push rod a pin mounted in said support recess and in an axial borehole in said push rod, a pinion mounted on said pin, a turning knob mounted on said push rod and outside the frame, a toothed gear mounted on the gas expansion valve for varying the flow of gas therethrough, said gear being in meshing engagement with the pinion whereby rotation of the push rod knob varies the flow of gas from the valve and the height of a flame resulting from ignition of said gas.

6. A lighter as defined in claim 1 and including a flange on the flint push lever and a projection on the pawl member said pawl projection adapted to contact the flint push lever flange when the pawl is pivoted downwardly whereby the flint push lever is also cammed downwardly.

7. A lighter as defined in claim 1 and further including a guide for the actuating push lever, said actuating lever having a U-shaped section the parallel sides of said lever being substantially paralleled to the sides of the frame, said guide also being U-shaped and affixed to the sides of said frame and protruding into the U-shaped opening of said push lever whereby said lever may be telescoped over said guide and cooperates therewith, the push lever spring being mounted on the guide and normally urging the actuating lever upwardly and about a pivot connection of the rear of said lever to the frame.

8. A lighter as defined in claim 7 wherein a pair of lugs are provided on the forward portion of the actuating lever, said lugs adapted to be engaged with the driver whereby the knurled spark wheel is rotated when the actuating lever is depressed and telescoped over the guide.

9. A lighter as defined in claim 7 wherein a pair of lugs of abrasion resistant metal is provided on the forward portion of the actuating lever, said lugs being subject to abrasion and adapted to be engaged with the drives whereby the knurled spark wheel is rotated when the actuating lever is depressed and telescoped over the guide.

References Cited by the Examiner

UNITED STATES PATENTS

| 2,551,688 | 5/51 | Metzler et al. | 67—7.1 |
| 2,836,044 | 5/58 | Zellweger | 67—7.1 |
| 2,943,471 | 7/60 | Newman | 67—7.1 |
| 2,948,134 | 8/60 | Quercia | 67—7.1 |

FOREIGN PATENTS

| 1,230,371 | 9/60 | France. |
| 733,033 | 7/55 | Great Britain. |

EDWARD J. MICHAEL, *Primary Examiner.*

FREDERICK L. MATTESON, Jr., PERCY L. PATRICK,
*Examiners.*